US007511831B2

(12) United States Patent
Muchnik

(10) Patent No.: US 7,511,831 B2
(45) Date of Patent: Mar. 31, 2009

(54) SPECIFIC DENSITY DETECTOR

(75) Inventor: Boris J. Muchnik, Washington, DC (US)

(73) Assignee: Nuclear Solutions, Inc., Washington, DC (US)

( * ) Notice: Subject to any disclaimer, the term of this patent is extended or adjusted under 35 U.S.C. 154(b) by 534 days.

(21) Appl. No.: 10/965,164

(22) Filed: Oct. 14, 2004

(65) Prior Publication Data

US 2006/0082765 A1 Apr. 20, 2006

(51) Int. Cl.
*G01J 1/00* (2006.01)
*G01J 1/42* (2006.01)

(52) U.S. Cl. ..................... 356/614; 356/152.3; 356/213

(58) Field of Classification Search ................. 356/614, 356/152, 345, 358, 4.01, 5.01, 213, 225, 356/152.1, 152.2, 152.3; 372/19, 33; 359/223, 359/850, 198, 212; 250/216, 234
See application file for complete search history.

(56) References Cited

U.S. PATENT DOCUMENTS 4,641,950 A * 2/1987 Rongen et al. .............. 347/243
4,732,472 A * 3/1988 Konig et al. ............. 356/152.3
4,839,525 A * 6/1989 Kano et al. ............ 250/559.21
5,258,821 A * 11/1993 Doggett et al. .............. 356/496
5,638,189 A * 6/1997 Yanagisawa ................ 358/481
5,877,884 A * 3/1999 Yanagisawa ................ 359/198
6,229,639 B1 * 5/2001 Ozarski et al. .............. 359/223
6,233,045 B1 * 5/2001 Suni et al. .................. 356/28.5

* cited by examiner

*Primary Examiner*—Sang Nguyen
(74) *Attorney, Agent, or Firm*—Michael L. Greenberg, Esq.; Greenberg & Lieberman, LLC

(57) ABSTRACT

An object is placed at a particular distance away from the nonreflecting side of a mirror, such that the gravitational force of the object affects the mirror. A laser is then pointed at the opposite, reflecting side of the mirror, thereby itself reflecting off the mirror and going back in to the cavity of the laser, creating a mode-hopping effect. The mirror will be affected by three forces, the force of a spring ($F_S$), the force of a modulating signal ($F_{MS}$), created by an electro mechanical device attached to the mirror, and the gravitational force of objects as they approach and recede away from the mirror.

3 Claims, 1 Drawing Sheet

100
30
60
12
10
90
14
80
50

SPECIFIC DENSITY DETECTOR

BACKGROUND OF THE INVENTION

This invention deals with two high level concepts that are common in the art. The first concept is mode-hopping. Mode-hopping is an energy transfer from one transverse electronic mode (TEM) to another. For example, the most common mode hopping occurs between the fundamental mode (TEM00) and the donut mode (TEM01). Mode-hopping has been observed in semiconductor lasers due to the laser light fed back in to the laser cavity as a result of reflections. The laser energy distribution in a beam will switch from one mode to another as a function of the laser light fed back in to the cavity.

Inventions that discuss the mode-hopping phenomenon usually discuss the negative aspects. Mode-hopping is seen as a drawback to most lasers, particularly as it deals with an increase in temperature. Mode-hopping creates a situation by which, for a given pumping current, the laser can hop to a completely different mode. This "instability" has been linked to the occurrence of unwanted intensity noise, a change in injection strength (detuning), a reduction in beam power, and overall distress to users of various mechanisms utilizing lasers (including semiconductor lasers in compact disc players and bar-code scanners).

Mode-hopping has also been connected to problems other than use of lasers. In telecommunications, the switching from one mode to another affects the maximum data transmission rate, because different wavelengths have different velocities in single-mode fibers with high dispersion.

The second concept common in the art is the gravity meter, also known as a gradiometer. The concept of gradiometers has been known for some considerable time. Gradiometers measure the differential curvature or ellipticity of gravity equipotential surfaces, the rate of change of the increase of gravity in the horizontal direction, and/or the rate of increase of gravity in the vertical direction. Their object is to measure small changes in the acceleration of a mass due to gravity, known as "g". Through discovery of "g", one can determine the mass, specific density, etc. of a given space.

While gradiometers provide a method by which to obtain data regarding spaces, particularly dealing with land surveillance, most gradiometers have been expensive to manufacture and are unsuitable for long-term installation in the field. Because of the expense, care and accuracy that need to be put into their use, gradiometers are not suitable for everyday use. Furthermore, the gravity gradient measurements are associated with significant noise patterns.

SUMMARY OF THE INVENTION

The present invention introduces mode-hopping as a method by which one can determine the specific density of an object at a distance. An object is placed at a particular distance away from the nonreflecting side of a mirror, such that the gravitational force of the object affects the mirror. A laser is then pointed at the opposite, reflecting side of the mirror, thereby itself reflecting off the mirror and going back in to the cavity of the laser, creating a mode-hopping effect. The mirror will be affected by three forces, the force of a spring ($F_S$), the force of a modulating signal ($F_{MS}$), created by an electro mechanical device attached to the mirror, and the gravitational force of objects as they approach and recede away from the mirror.

Attached to the laser will be a microprocessor that will record the occurring mode-hopping activity. Because the gravitational force imposed on the mirror will change due to the gravitational force of the moving object ($F_{MU}$) as a result of the distance changing between the mirror and the object. It is necessary for either the device or the object to move because it is the change in the distance that is being measured and without the movement the device will not function. The device will take into consideration $F_S$, $F_{MS}$, $F_{MU}$ and the distance between the object and the mirror, the change in the gravitational force on the mirror is calculated and plotted on a graph. By taking the second derivative of that function, we will be able to deduct the rate of change of the gravitational force between the mirror and the object, which is proportional to the specific density of the object.

DETAILED DESCRIPTION OF THE PREFERRED EMBODIMENTS

Figure 1:
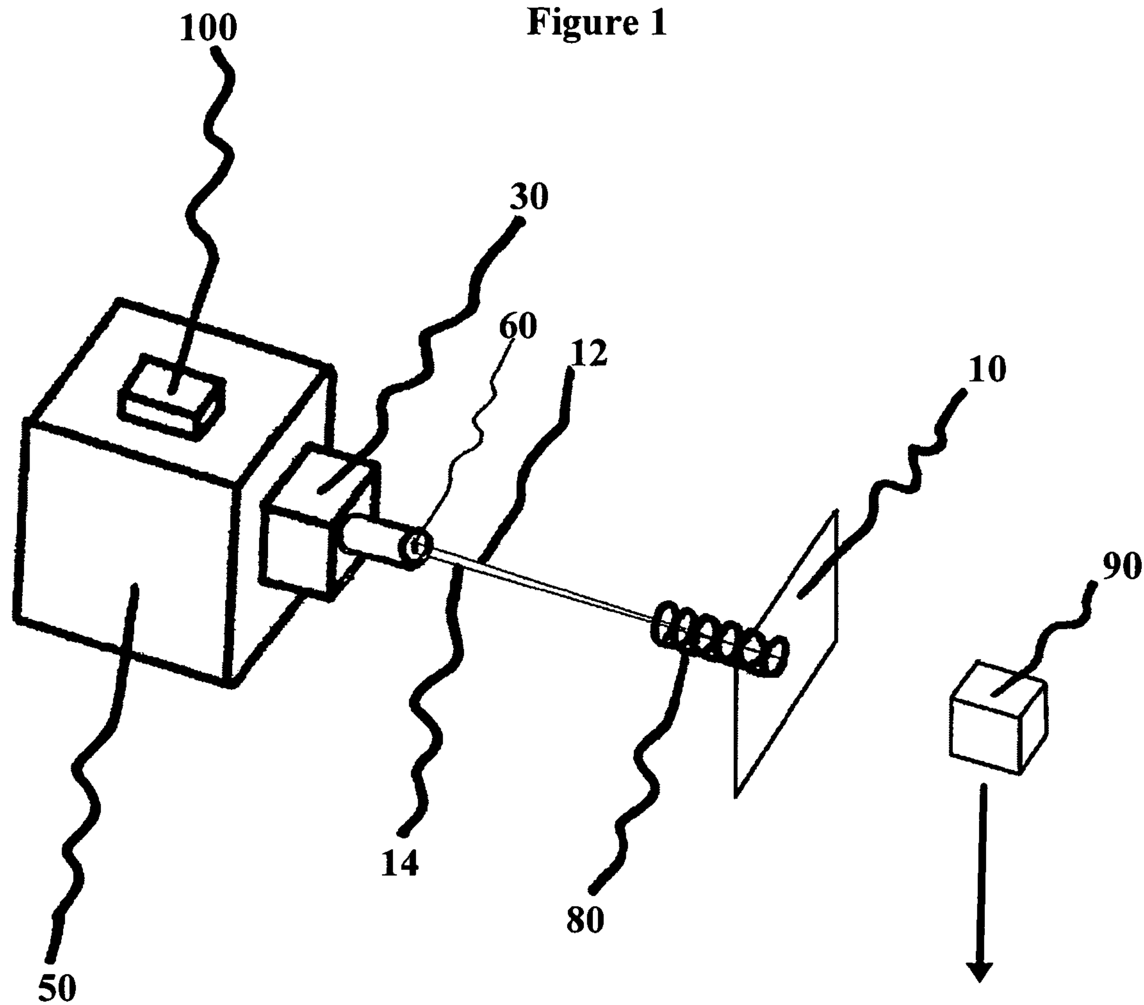
FIG. 1 shows an environmental perspective view of the present invention.

The present invention contains a (HSL) laser (50), which emits laser beams (12) towards an asymmetrically mounted mirror (amm) (10); the mirror (10) is positioned such that the reflecting side is facing towards the laser (50). The heterostructure laser (50) emits beams (12) that enter a collimating lens (30), which is normally part of the commercially available semiconductor lasers. The collimating lens (30) directs the beams (12) such that they are directed in a straight line towards the mirror (10). The emitted beams (12) then go through a narrow slit (60). The emitted beams (12) then reflect off the mirror (10), reflecting back to the laser (50), and the elements of the return beams (14) which go through the narrow slit (60) will go back in to the cavity of the laser (50), thereby creating a mode-hopping effect and depressing the single mode hopping mode. The system is optically aligned to maximize the effect of suppressing the single fundamental mode. This minimizes the emitted beams (12) of the laser (50). Any misalignment of the mirror (10) will cause the increase in the intensity of the output of the emitted beams (12).

The mirror (10) is mounted as part of the present invention, asymmetrically, via a spring (80) that allows the mirror (10) to move. The return beams (14) are reflected off the mirror (10) in different directions as a result of the movement of the mirror (10). While most of the return beams (14) do not get reflected back into the laser (50), the narrow slit (60) serves to ensure that when return beams (14) are in the correct position, as much light as possible is reflected back into the laser (50) in order to ensure the return beams (14) enter the laser cavity of the laser (50) and mode hopping is maximized.

On the opposite, nonreflecting side of the mirror (10) will be an object (90). The object (90) will have its own gravitational force ($F_{MU}$). The gravitational force will then be established between the mirror (10) and the object (90). This gravitational force will change as a result of moving the object (90) in the perpendicular direction to the axis of the mirror (10). Due to the change in the distance between the object (90) and the mirror (10), according to Newton's gravitational law the gravitational force is inversely proportional to the square of the distance. This changing force will produce a change in the orientation of the mirror (10), which will subsequently misalign the original optical setup described above. That angle of misalignment, which is proportional to the gravitational force will cause an increase in the return beams (14) and subsequently will become the measure of the gravitational force.

The return beams (14) will be then detected and plotted as a function of the changing gravitational force. The second derivative of this plot will be proportional to the specific density of the object (90) and will be deducted electronically by the microprocessor (100) based on the above described measurements. The second derivative of different materials would be associated with specific densities, which will be then calibrated and stored in the microprocessor (100) for comparison to real time objects. Therefore, the microprocessor (100) will be able to distinguish between materials of interest, such as heavy metals or any other object or the lack thereof.

It should be understood that the change in the angle of the mirror and therefore the return beams (14) coming off the mirror (10) is extremely small due to the fact that the gravitational force between the object (90) and the mirror (10) is marginally measurable. Nevertheless, there are numerous methods for amplifying this effect that are commonly known. One of these techniques would be the use of an optical multiplexer commonly used in the telecommunications industry. Optical multiplexer devices are designed to amplify the input laser beam angle by virtue of multiple internal reflections. Any of the other commonly known methods for such amplification are included in this patent by reference.

The mode-hopping is detected out of laser (50) is the same as that used in a standard cd player. Detection method is that as conventionally known.

The present invention is not limited to the embodiments described above, but also has all embodiments within the scope of the following claims.

I claim:

1. A specific density detector, comprising:

a laser, fired from a cavity;

a mirror, positioned to reflect a laser beam produced by said laser back toward said laser, and into said cavity;

a spring, in communication with said mirror;

a collimating lens, in communication with said laser;

a narrow slit disposed between said laser and said mirror; and a microprocessor, in communication with said laser, for determining said specific density of said object.

2. A method for detecting specific density, comprising:

firing a first laser beam at a front side of a mirror,said first laser beam fired from a cavity;

passing an object past a backside of said mirror;

measuring mode hopping in said cavity;

plotting a second laser beam, said second laser beam being said first laser beam reflected from said mirror, as a function of the changing gravitational force of said object;

determining a second derivative from plotting said laser beam as a function of the changing gravitational force of said object;

determining a specific density of said object in proportion to said second derivative.

3. The method of claim 2, further comprising mounting said mirror in a flexible fashion so that said mirror moves in response to passing the object past the backside of said mirror.

* * * * *